(12) United States Patent
Hsu

(10) Patent No.: US 11,108,110 B2
(45) Date of Patent: Aug. 31, 2021

(54) BATTERY HOLDER AND SIDE FRAME THEREOF

(71) Applicant: MOBILETRON ELECTRONICS CO., LTD., Taichung (TW)

(72) Inventor: Ming-Hung Hsu, Taichung (TW)

(73) Assignee: Mobiletron Electronics CO., LTD., Taichung (TW)

( * ) Notice: Subject to any disclaimer, the term of this patent is extended or adjusted under 35 U.S.C. 154(b) by 244 days.

(21) Appl. No.: 15/975,322

(22) Filed: May 9, 2018

(65) Prior Publication Data
US 2019/0221794 A1    Jul. 18, 2019

(30) Foreign Application Priority Data

Jan. 18, 2018 (TW) .................................. 107101814

(51) Int. Cl.
H01M 50/20 (2021.01)
H01M 50/172 (2021.01)
H01M 50/258 (2021.01)

(52) U.S. Cl.
CPC ......... *H01M 50/20* (2021.01); *H01M 50/172* (2021.01); *H01M 50/258* (2021.01)

(58) Field of Classification Search
CPC .... H01M 2/1077; H01M 2/0245; H01M 2/06; H01M 2/1016; H01M 2/1022; H01M 50/20; H01M 50/528; H01M 50/172
See application file for complete search history.

(56) References Cited

U.S. PATENT DOCUMENTS

| 2009/0305104 | A1 | 12/2009 | Matsumoto et al. | |
| 2011/0104552 | A1* | 5/2011 | Kim | H01M 2/1264 429/151 |
| 2013/0288094 | A1* | 10/2013 | Noh | H01M 2/1077 429/99 |

(Continued)

FOREIGN PATENT DOCUMENTS

CN    1641918 A    7/2005

OTHER PUBLICATIONS

Examination report for TW107101814, dated Jul. 19, 2018, Total of 2 pages.

(Continued)

*Primary Examiner* — Jimmy Vo
(74) *Attorney, Agent, or Firm* — Tracy M Heims; Apex Juris, PLLC

(57) ABSTRACT

A battery holder includes at least two connecting shafts, a first lateral frame, and a second lateral frame, wherein two juxtaposed battery assemblies are disposed between the first lateral frame and the second lateral frame. The at least two connecting shafts respectively pass through the corresponding battery modules, and is connected to the first lateral frame and the second lateral frame. The first lateral frame includes two adjacent side frames, each of which includes a first side bar and a second side bar which is opposite to the first side bar. The first side bar has a first perforation, and the second side bar has a second perforation, wherein a width of the first perforation is greater than a width of the second perforation. An engaging member passes through the first perforation and the second perforation, whereby to fix one of the side frames to another one.

10 Claims, 9 Drawing Sheets

(56) References Cited

U.S. PATENT DOCUMENTS

2014/0050966 A1* 2/2014 Merriman ........... H01M 2/1077
429/156

OTHER PUBLICATIONS

Search report for TW107101814, dated Jul. 19, 2018, Total of 1 page.
English Abstract for CN1641918, Total of 1 page.

* cited by examiner

BATTERY HOLDER AND SIDE FRAME THEREOF

BACKGROUND OF THE INVENTION

Technical Field

The present invention is related to a fixing device for fixing battery assemblies, and more particularly to a battery holder and a side frame thereof.

Description of Related Art

With the advancement in technology, the demand for electricity is increasing. Power supplies such as alternating current or battery assemblies consisting of a plurality of connected battery modules could be utilized to supply a large amount of electricity. The advantage of battery assemblies is that the power supply is movable and would not be limited to a fixed location.

A battery holder is a tool utilized to fix a plurality of battery modules. A conventional battery holder includes a bottom frame and two lateral frames, wherein the lateral frames are disposed on the bottom frame and are spaced from each other by a distance, and an accommodating space is formed between the bottom frame and the lateral frames to receive a plurality of battery modules arranged along a predetermined axial direction.

However, it is possible that a total length of the plurality of arranged battery modules is not equal to a predetermined distance between the two lateral frames because of a dimension tolerance between the battery modules. For example, when the total length is smaller than the predetermined distance, the battery modules could not be fixed stably by the two lateral frames; when the total length is greater than the predetermined distance, the battery modules could not be received between the two lateral frames.

Hence, it is required to improve the design of the conventional battery holder.

BRIEF SUMMARY OF THE INVENTION

In view of the above, an object of the present invention is to provide a battery holder and a side frame thereof, wherein the side frame could be finely adjusted corresponding to a dimension tolerance between battery modules.

To achieve the object mentioned above, the present invention provides a battery holder adapted to fix two juxtaposed battery assemblies, wherein each of the battery assemblies includes a plurality of battery modules arranged along a predetermined axial direction. The battery holder comprising at least two connecting shafts, a first lateral frame, and a second lateral frame, wherein each of the at least two connecting shafts extends along the predetermined axial direction. The at least two connecting shafts respectively pass through the battery modules of each of the battery assemblies. The first lateral frame includes two side frames, wherein each of the side frames includes a main plate, a first side bar, and a second side bar, wherein each of the main plates has a first blocking surface, and the first side bar and the second side bar are respectively connected to two opposite sides of the main plate; the first side bar has a first perforation, and the second side bar has a second perforation corresponding to the first perforation; the first perforation of the first side bar has a first width in the predetermined axial direction, and the second perforation of the second side bar has a second width in the predetermined axial direction, wherein the first width is greater than the second width; the first side bar of one of the side frames is adjacent to the second side bar of another one of the side frames; an engaging member passes through the first perforation of the first side bar and the second perforation of the second side bar which are adjacent to each other to fix the first side bar to the second side bar; each of the at least two connecting shafts has one end connected to a corresponding one of the main plates of the side frames. The second lateral frame has two second blocking surfaces, wherein each of the second blocking surfaces faces toward the first blocking surface of the main plate of one of the side frames; each of the at least two connecting shafts has another end connected to a corresponding one of the second lateral frames; the battery assemblies are respectively disposed between each of the first blocking surfaces and a corresponding one of the second blocking surfaces.

The present invention provides a side frame of a battery holder comprising a main plate, a first side bar, and a second side bar, wherein the first side bar and the second side bar are respectively connected to two opposite sides of the main plate; the first side bar has a first perforation, and the second side bar has a second perforation corresponding to the first perforation; the first perforation of the first side bar has a first width in the predetermined axial direction perpendicular to the main plate, and the second perforation of the second side bar has a second width in the predetermined axial direction, wherein the first width is greater than the second width.

The present invention provides a battery holder adapted to fix a battery assembly, wherein the battery assembly includes a plurality of battery modules arranged along a predetermined axial direction. The battery holder comprising at least one connecting shaft and two lateral frames, wherein the at least one connecting shaft extends along the predetermined axial direction and passes through the battery modules; the two lateral frames are spaced from each other by a distance in the predetermined axial direction; each of the lateral frames includes a main plate, a first side bar, and a second side bar, wherein the first side bar and the second side bar are respectively connected to two opposite sides of the main plate; each of the main plates has a blocking surface, wherein the two blocking surfaces faces each other; two opposite ends of the at least one connecting shaft are respectively connected to the two lateral frames; the battery assembly is disposed between the two blocking surfaces faces.

The advantage of the present invention is that the side frame of the battery holder could be finely adjusted corresponding to the dimension tolerance between the casings of the battery modules of the two battery assemblies, whereby to fix the battery assemblies stably. In addition, since the side frames have the same structures, the manufacturing cost could be saved and the assembling procedure could be simplified, and the side frames could be adapted to fix only one battery assembly as well.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
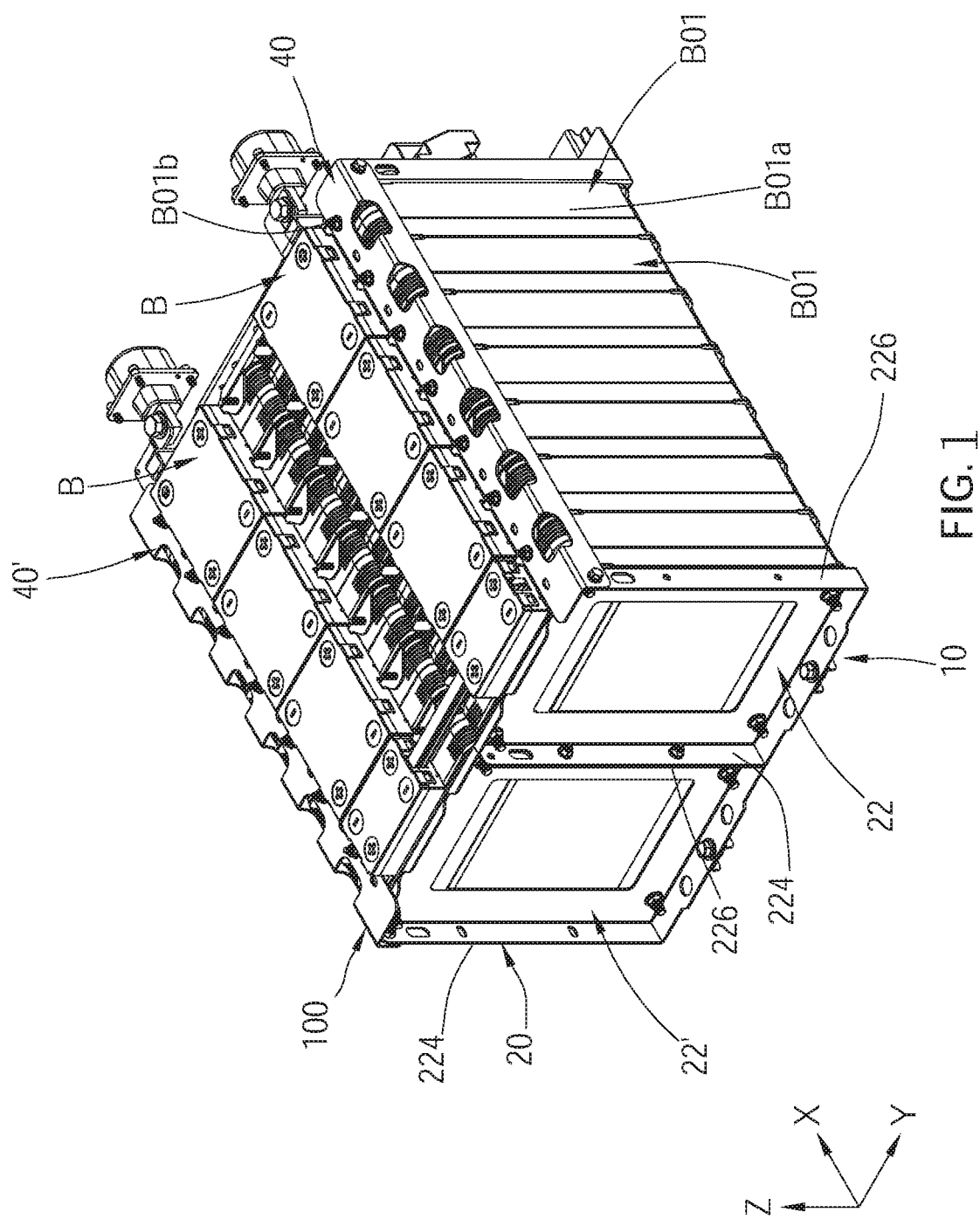
FIG. 1 is a perspective view of a battery holder with fixed battery assemblies of a first embodiment according to the present invention.

The following illustrative embodiments and drawings are provided to illustrate the disclosure of the present invention, these and other advantages and effects can be clearly understood by persons skilled in the art after reading the disclosure of this specification. As shown in FIG. 1, a battery holder 100 of a first embodiment according to the present invention is illustrated. The battery holder 100 is adapted to fix two juxtaposed battery assemblies B. In order to illustrate easily, three axial directions, which are perpendicular to one another, are defined, wherein the three axial directions include a first axial direction which is defined as a predetermined axial direction X of the present invention, a second axial direction Y, and a third axial direction Z. Wherein, each of the battery assemblies B includes a plurality of battery modules B01 arranged along the predetermined axial direction X, and casings B0la of two adjacent battery modules B01 of each of the battery assemblies B abut against each other.

Figure 2:
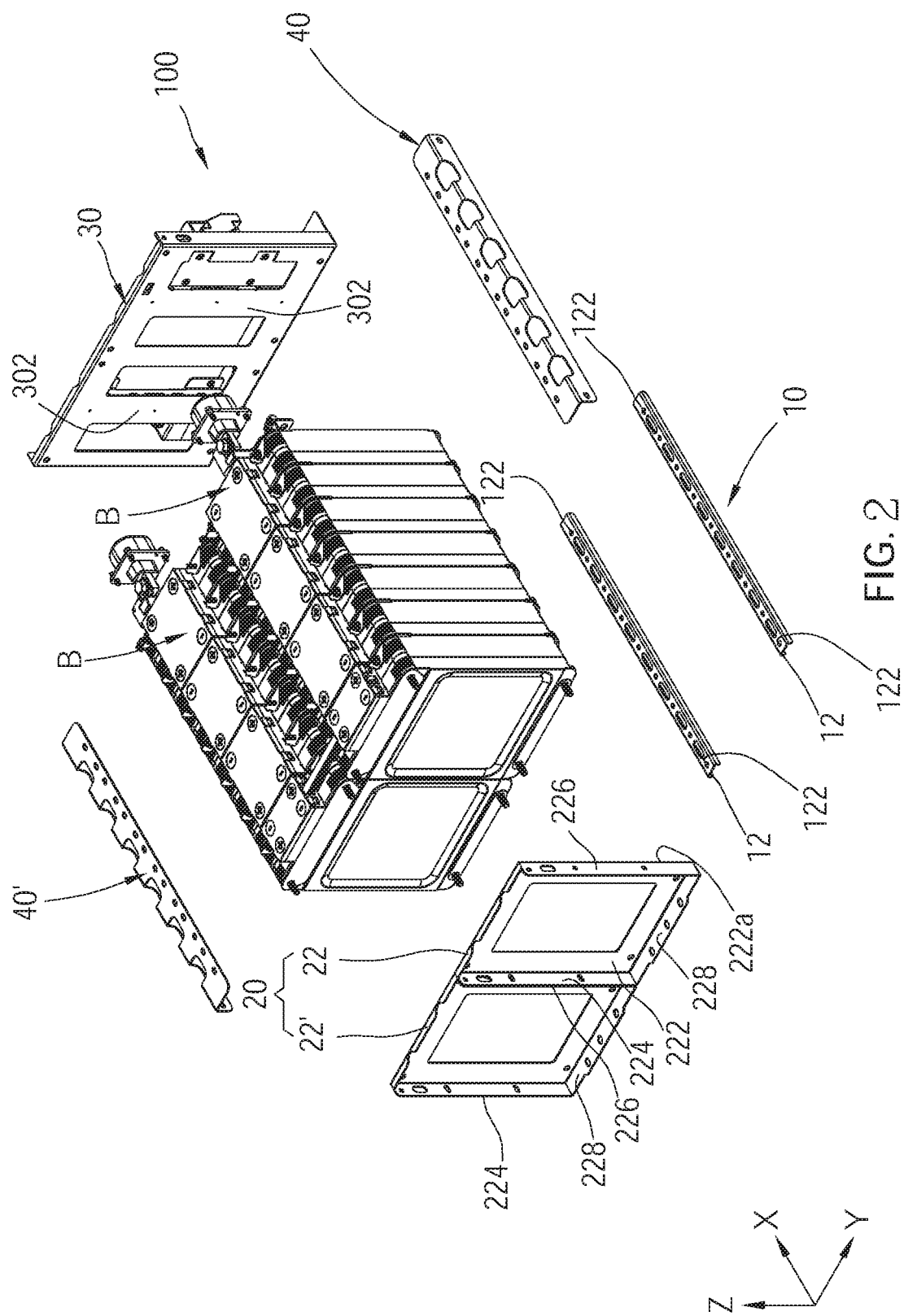
FIG. 2 is an exploded perspective view of the battery holder of FIG. 1.
Figure 3:
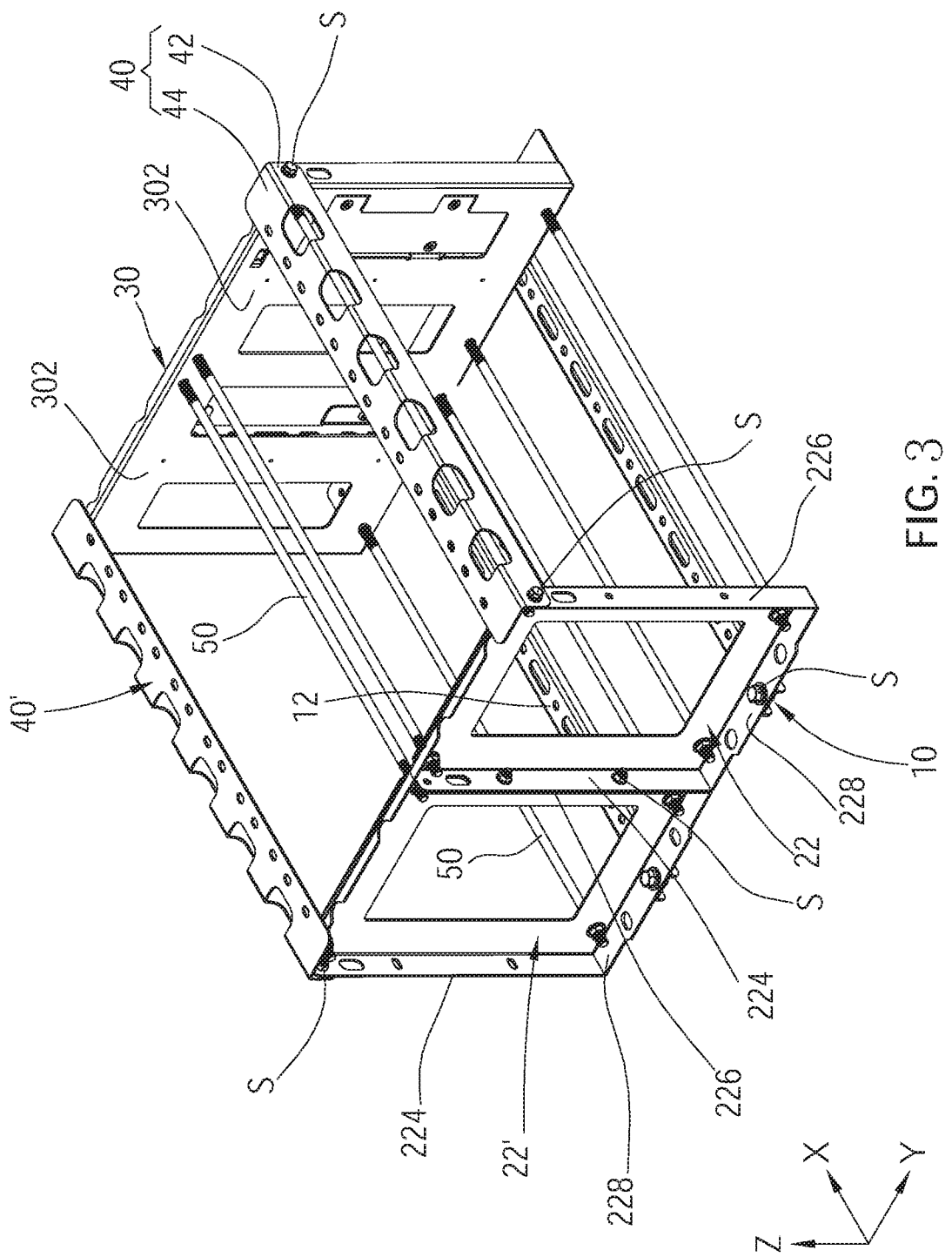
FIG. 3 is a perspective view of the battery holder of FIG. 1.

As shown in FIG. 2 and FIG. 3, the battery holder 100 includes a bottom frame 10, a first lateral frame 20, and a second lateral frame 30, wherein the bottom frame 10 includes two supporting bars 12 for supporting the battery assemblies B, wherein the two supporting bars 12 are respectively disposed below each of the two battery assemblies B. Each of the supporting bars 12 extends along the predetermined axial direction X, and each of two opposite ends of each of the supporting bars 12 has a first through hole 122, that is, the bottom frame 10 of the present invention includes four first through holes 122.

Figure 4:
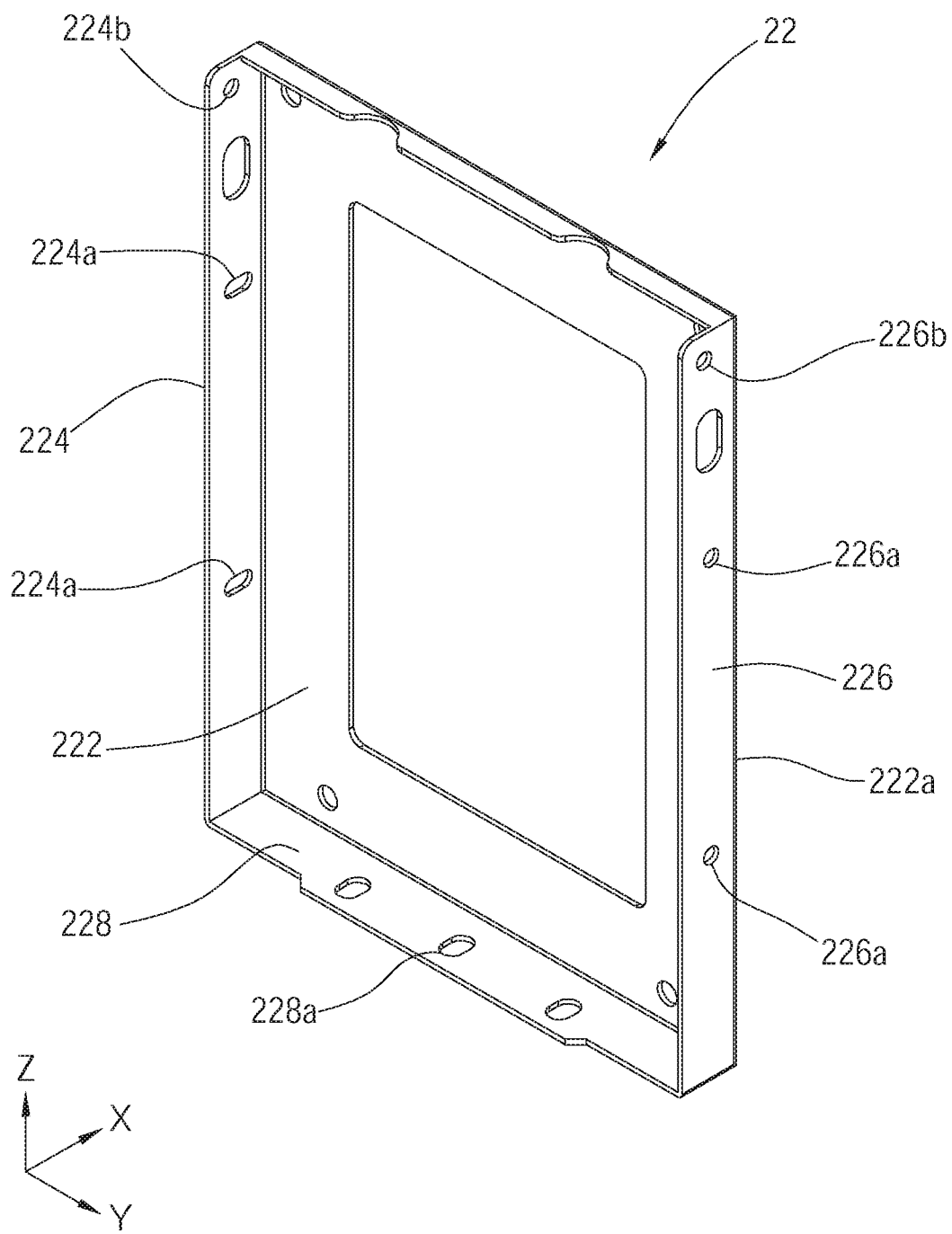
FIG. 4 is a perspective view of the side frame of the battery holder of FIG. 1.

The first lateral frame 20 includes two side frames 22, 22', wherein the two side frames 22, 22' have the same structures. Referring to FIG. 4, in order to illustrate easily, one of the side frames 22, 22' is used for illustration. The side frame 22 includes a main plate 222, a first side bar 224, and a second side bar 226, wherein the main plate 222 is disposed perpendicular to the predetermined axial direction X, and has a first blocking surface 222a facing toward one of the battery assemblies B. The first side bar 224 and the second side bar 226 are respectively connected to two opposite sides of the main plate 222. The first side bar 224 and the second side bar 226 extend along the same axial direction (i.e., the third axial direction Z). The first side bar 224 has two first perforations 224a, and the second side bar 226 has two second perforations 226a corresponding to the first perforations 224a. Each of the first perforations 224a of the first side bar 224 has a first width in the predetermined axial direction X, and each of the second perforations 226a of the second side bar 226 has a second width in the predetermined axial direction X, wherein the first width is greater than the second width. Preferably, each of the first perforations 224a and each of the second perforations 226a have the same heights in the third axial direction Z. In this embodiment, each of the second perforations 226a is a circular hole, and each of the first perforations 224a is long in shape, wherein a longitudinal direction of each of the first perforations 224a is parallel to the predetermined axial direction X. The side frame 22 includes a bottom bar 228 connected to a bottom of the main plate 222, wherein the bottom bar 228 has a plurality of third perforations 228a arranged along the second axial direction Y. However, the number of the first perforation, the number of the second perforation, and the number of the third perforation are not a limitation of the present invention. In practice, the side frame 22 could be only disposed with one first perforation 224a, one second perforation 226a, and one third perforation 228a. The shape and the size of the perforations of the first side bar 224 and the second side bar 226 could be adjusted depending on the requirement.

Moreover, the first side bar 224 further has a fourth perforation 224b, and the second side bar 226 further has a fifth perforation 226b. In this embodiment, both of the fourth perforation 224b and the fifth perforation 226b are circular holes. The fourth perforation 224b is disposed approach to a top edge of the first side bar 224, and the fifth perforation 226b is disposed approach to a top edge of the second side bar 226.

The side frames 22, 22' are adjacent to each other and are disposed on the bottom frame 10, wherein the first side bar 224 of the side frame 22 is adjacent to the second side bar 226 of another side frame 22'. An engaging member S, which is a bolt and a nut as an example, is adapted to fix the side frames 22, 22' by passing through one of the first perforations 224a of the first side bar 224 of the side frame 22 and the adjacent second perforation 226a of the second side bar 226 of the side frame 22'.

Preferably, the side frames 22, 22' are respectively engaged with each of the supporting bars 12 of the bottom frame 10 and are movable along the predetermined axial direction X. In this embodiment, a width of each of the third perforations 228a in the predetermined axial direction X is greater than a width of each of the first through holes 122 in the predetermined axial direction X, wherein each of the third perforations 228a is long in shape, and each of the first through holes 122 is a circular hole. A longitudinal direction of each of the third perforations 228a is parallel to the predetermined axial direction X. An engaging member S, which is a bolt and a nut as an example, passes through the third perforation 228a and the first through hole 122 which are corresponding to each other, whereby to fix the bottom bars 228 to the supporting bars 12 of the bottom frame 10.

The second lateral frame 30 is engaged with the bottom frame 10, and is spaced from the first lateral frame 20 by a distance in the predetermined axial direction X. The second lateral frame 30 has two second blocking surfaces 302, wherein the second blocking surfaces 302 respectively face toward the first blocking surface 222a of the main plate 222 of one of the side frames 22, 22'. Each of the battery assemblies B is located between one of the first blocking surfaces 222a and each of the second blocking surfaces 302 which face each other. By disposing the first blocking surfaces 222a and the second blocking surfaces 302 on two lateral sides of the battery assemblies B, the battery assemblies B could be held and fixed. In this embodiment, the second lateral frame 30 is a single frame, and the two second blocking surfaces 302 are located on the same surface of the single frame. In practice, the second lateral frame 30 could include two frames with the same structures, just like the side frames 22, 22', and the two frames of the second lateral frame 30 could be engaged in the same way with the first lateral frame 20. Also, the second lateral frame 30 could be engaged with the supporting bars 12 in the same way with the first lateral frame 20 engaged with the supporting bars 12.

Figure 5:
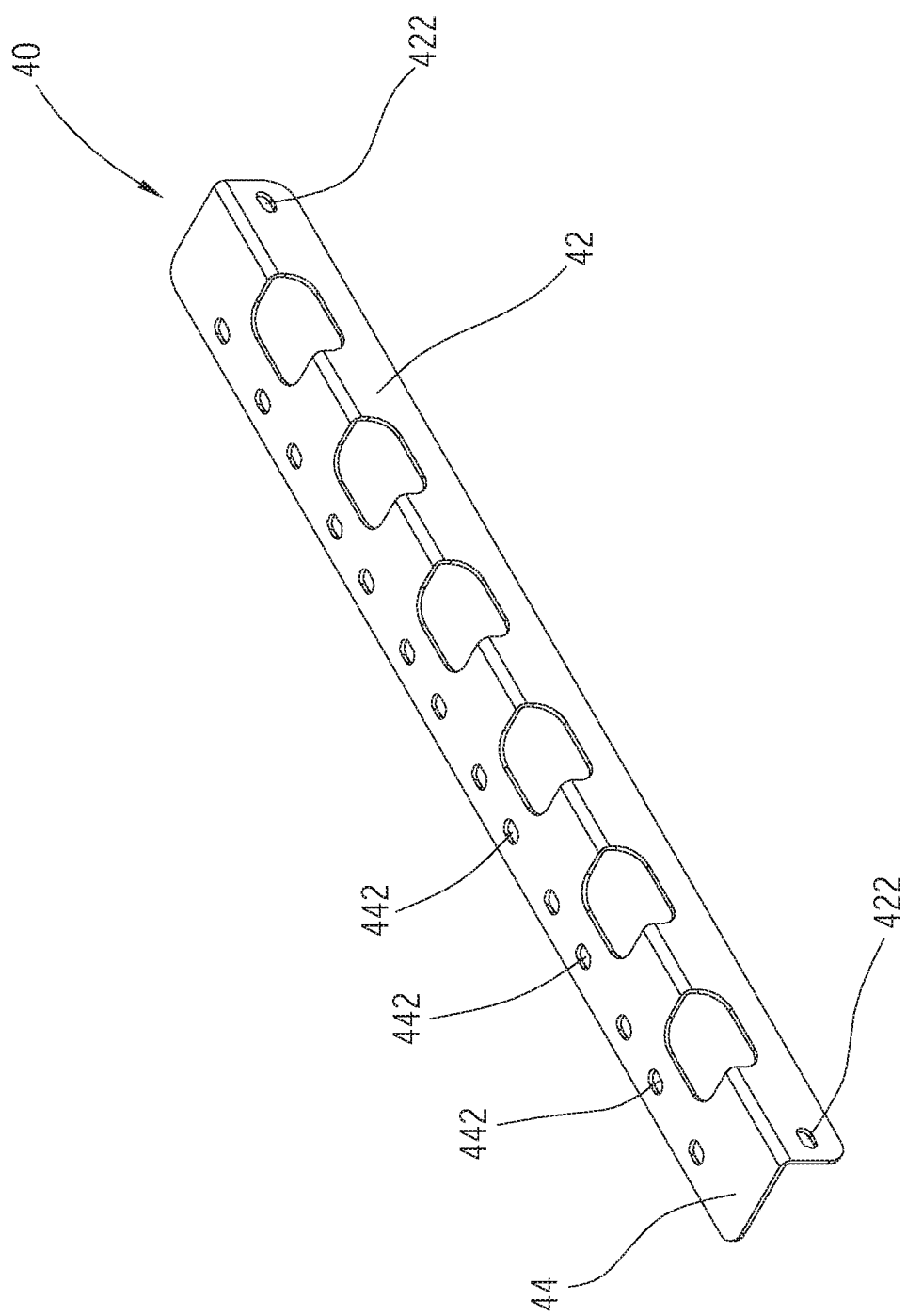
FIG. 5 is a perspective view of the side bar of the battery holder of FIG. 1.

In this embodiment, the battery holder 100 further includes two side bars 40, 40', which have the same structures. As shown in FIG. 5, the side bar 40 is illustrated as an example, wherein the side bar 40 includes a side plate 42 and a top plate 44. One end of the side plate 42 has a second through hole 422 which is adapted to be engaged with the first lateral frame 20, while another end thereof also has a second through hole 422 which is adapted to be engaged with the second lateral frame 30. A width of each of the second through holes 422 in the predetermined axial direction X is greater than both of a width of each of the fourth perforations 224b and a width of each of the fifth perforations 226b of the side frames 22, 22' in the predetermined axial direction X. The top plate 44 is connected to a top side of the side plate 42 and is perpendicular to the side plate 42. The top plate 44 has a plurality of holes 442 spaced from one another by a distance in the predetermined axial direction X, wherein the holes 442 of the top plate 44 are long in shape, and a longitudinal direction of each of the holes 442 of the top plate 44 is parallel to the predetermined axial direction X.

An engaging member S, which is a bolt and a nut as an example, passes through the fourth perforation 224b and the second through hole 422 which are corresponding to each other, whereby to fix one end of the side plate 42 of the side bar 40' to the first side bar 224 which is not adjacent to the side frame 22 (that is, the first side bar 224 of the side frame 22'). Another engaging member S, which is a bolt and a nut as an example, passes through the fifth perforation 226b and the second through hole 422 which are corresponding to each other, whereby to fix one end of the side plate 42 of the side bar 40 to the second side bar 226 which is not adjacent to the side frame 22' (that is, the second side bar 226 of the side frame 22). Another end of the side plate 42 of each of the side bars 40, 40' is respectively engaged with one of two opposite sides of the second lateral frame 30. In this embodiment, engaging members S, each of which is a bolt and a nut as an example, respectively pass through the second through hole 422 of another end of each of the side plates 42 and the second lateral frame 30, whereby to fix the side bars 40, 40' to the second lateral frame 30. In practice, the second through holes 422 could be only disposed on the top plate 44, and through holes corresponding to the second through holes 422 could be disposed on the side frames 22, 22' and the second lateral frame 30 to be engaged with the second through holes 422; the second through holes 422 could also be disposed on both of the top plate 44 and the side plate 42.

In this embodiment, the battery holder 100 is disposed with a plurality of connecting shafts 50 which are located between the first lateral frame 20 and the second lateral frame 30, wherein the connecting shafts 50 are adapted to connect the battery modules B01. One end of each of the connecting shafts 50 is connected to one of the main plates 222 of the side frames 22, 22', and another end of each of the connecting shafts 50 is connected to the second lateral frame 30. In this embodiment, two opposite ends of each of the connecting shafts 50 are threaded, and each of the battery modules B01 has a plurality of perforations to be passed through by the connecting shafts 50, which not only facilitates alignment assembling process, but also could be in conjunction with nuts, so that the two opposite ends of each of the connecting shafts 50 are respectively screwed to the first lateral frame 20 and the second lateral frame 30, whereby to fix and position the battery modules B01 via the connecting shafts 50, the first lateral frame 20, and the second lateral frame 30. In practice, the connecting shafts 50 could be long bolts as an example; the battery holder 100 could be disposed with at least two connecting shafts 50 corresponding to the two battery assemblies B.

Figure 6:
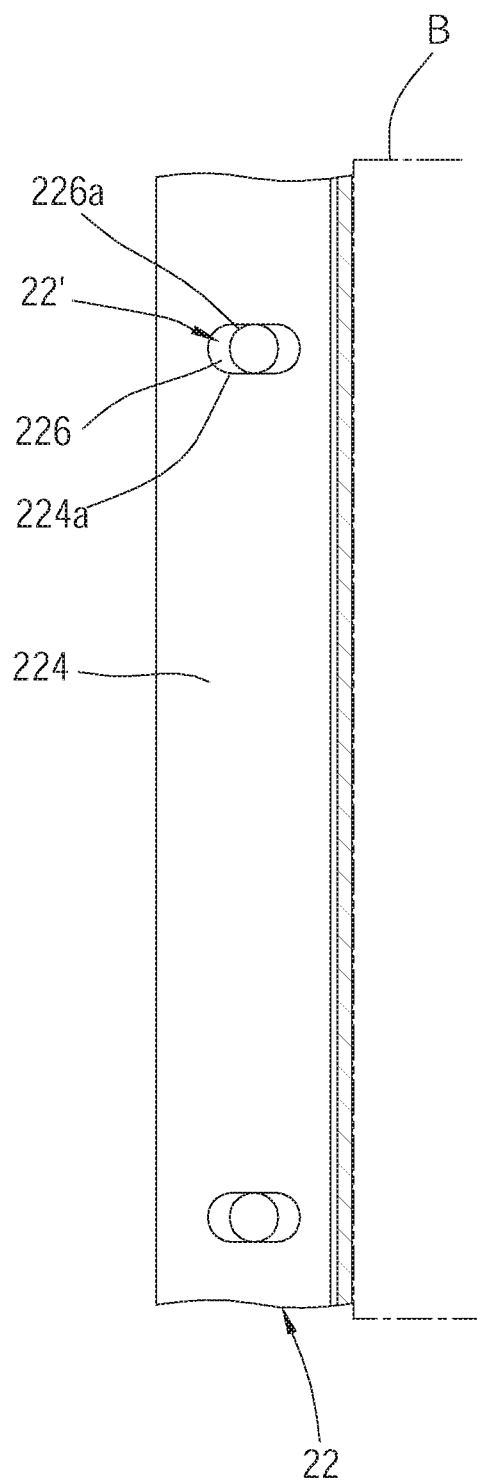
FIG. 6 is a schematic view showing that the two side frames are aligned with each other.
Figure 7:
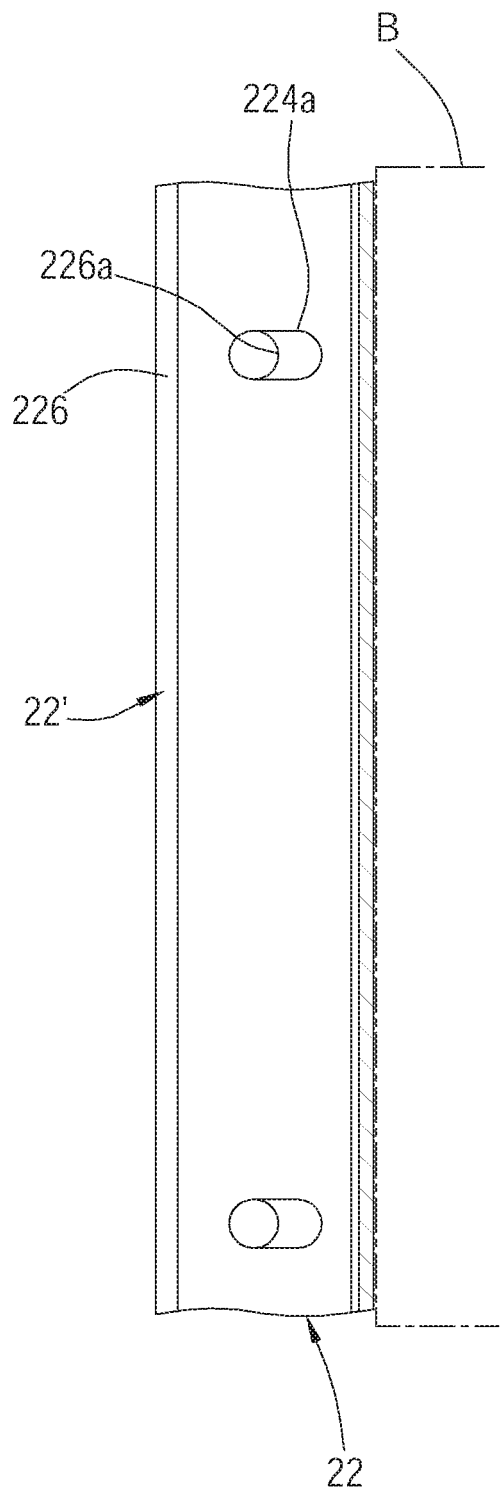
FIG. 7 is a schematic view showing that one of the two side frames moves toward the battery assembly.

A dimension tolerance between the casings B01a of the battery modules B01 of the two battery assemblies B may cause the total length of each of the two battery assemblies B in the predetermined axial direction X to be different. With the aforementioned structure of the battery holder 100, the position of the side frames 22, 22' could be finely adjusted to maintain the total length of each of the two battery assemblies B in the predetermined axial direction X. Referring to FIG. 6 and FIG. 7, when the total lengths of the two battery assemblies B are equal, the first perforations 224a of the first side bar 224 of the side frame 22 and the second perforations 226a of the second side bar 226 of the side frame 22' would be aligned with each other, that is, the second perforations 226a are respectively positioned in the center of each of the first perforations 224a (as shown in FIG. 6). On the other hand, when the total length of one of the battery assemblies B, which is corresponding to the side frame 22, is shorter, the side frame 22 could be moved toward the battery assembly B so as to fix the battery assembly B. Moreover, since the side frames 22, 22' have the same structure, the side frames 22, 22' could be exchanged with each other to alter their positions during the assembling process, thereby saving the manufacturing cost and simplifying the assembling procedure.

Figure 8:
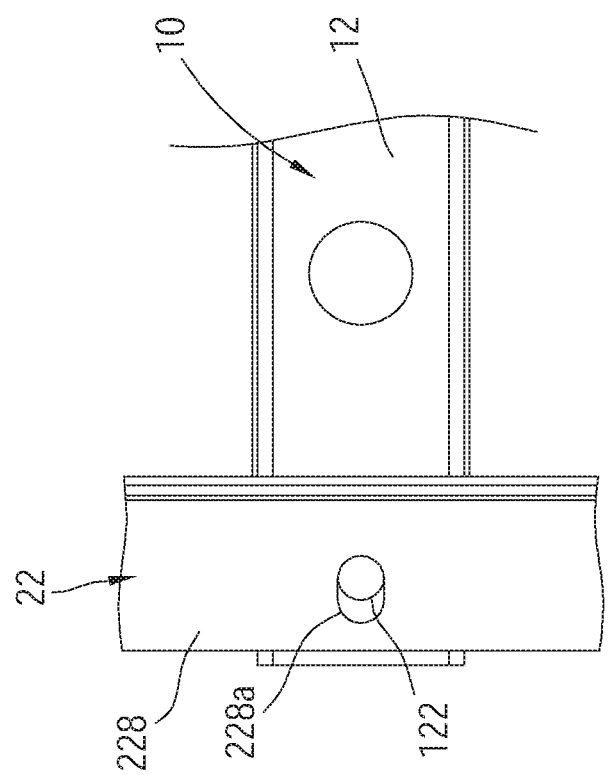
FIG. 8 is a schematic view showing that one of the third perforations of the side frame and one of the first through holes of the bottom frame are corresponding to each other.

Referring to FIG. 8, the third perforation 228a of the bottom bar 228 of the side frame 22 is corresponding to the first through hole 122 of the supporting bar 12 of the bottom frame 10, that is, the first through hole 122 is located within a range of the third perforation 228a and the position of the side frame 22 could be finely adjusted.

Figure 9:
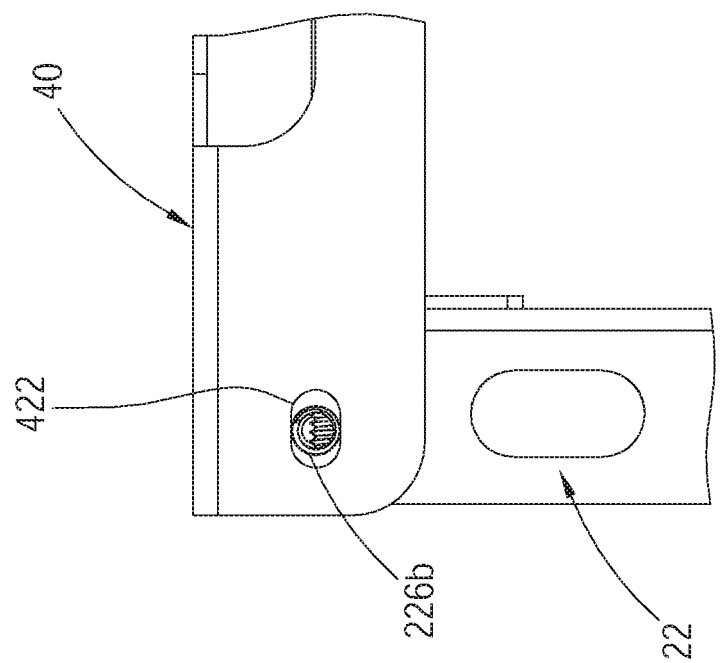
FIG. 9 is a schematic view showing that one of the second through holes of the side bar and the fifth perforation of the side frame are corresponding to each other.

Referring to FIG. 9, the second through hole 422 of the side bar 40 is corresponding to the fifth perforation 226b of the side frame 22 as well, that is, the fifth perforation 226b is located within a range of the second through hole 422 and the position of the side frame 22 could be finely adjusted. Similarly, the fourth perforation 224b of the side frame 22' is located within a range of the second through hole 422 of the side bar 40' as well, and the position of the side frame 22' could be finely adjusted.

Figure 10:
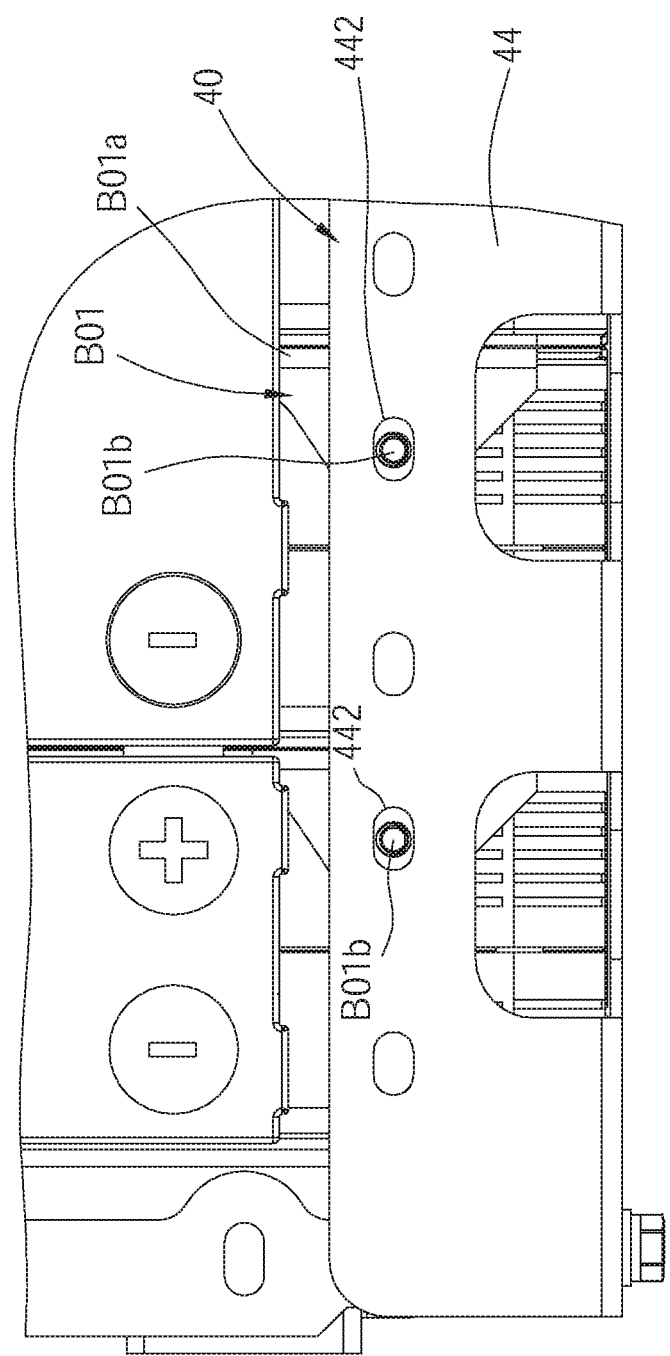
FIG. 10 is a schematic view showing that the fixing bolts disposed on the battery modules respectively penetrate through each of the holes of the side bar.

Referring to FIG. 10, fixing bolts B01b on a top of the battery modules B01 respectively penetrate through each of the holes 442 of the top plate 44 of the side bar 40, whereby the positions of the battery modules B01 could be finely adjusted corresponding to the dimension tolerance between the casings B01a of the battery modules B01. Meanwhile, the fixing bolts B01b could be fixed with nuts.

Figure 11:
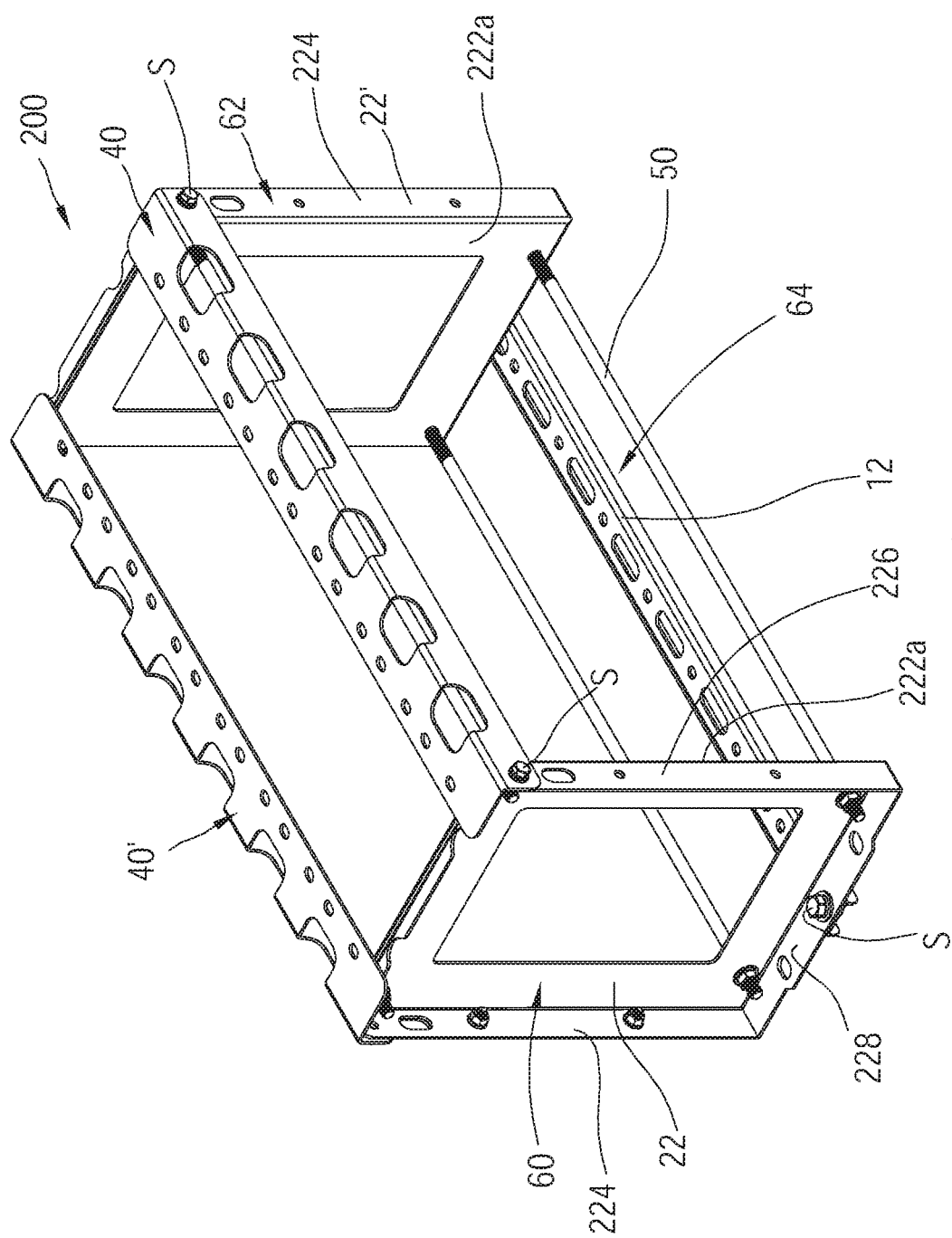
FIG. 11 is a perspective view of a battery holder of a second embodiment according to the present invention.

Referring to FIG. 11, a battery holder 200 of a second embodiment according to the present invention has almost the same structure as the battery holder 100 of the first embodiment, except that a first lateral frame 60 includes only one side frame 22 and a second lateral frame 62 includes another side frame 22' and a bottom frame 64 includes only one supporting bar 12. An engaging member S passes through one of the third perforations 228a of the bottom bar 228 and the first through hole 122 of the supporting bar 12 of the bottom frame 64, whereby to fix the side frames 22, 22'. The blocking surfaces 222a of the side frames 22, 22' face each other. In order to fix one end of each of the side bars 40, 40' to each first side bar 224 of the side frames 22, 22' respectively, another engaging member S is used to pass through the fourth perforation 224b and the second through hole 422 which are corresponding to each other. Similarly, an engaging member S passes through the fifth perforation 226b and the second through hole 422, whereby to fix another end of each of the side bars 40, 40' to each second side bar 226 of the side frames 22, 22' respectively. Two opposite ends of at least one connecting shaft 50 are connected to the side frames 22, 22'. In this way, the battery holder 200 could be adapted to fix a battery assembly.

The aforementioned engaging member S is not limited to a pair of a bolt and a nut and could be other engaging members such as a rivet as an example.

According to the illustration mentioned above, the side frames 22, 22' of the battery holder 100 of the present invention could be finely adjusted corresponding to the dimension tolerance between the casings B01a of the battery modules B01 of the two battery assemblies B, whereby to fix the battery assemblies B stably. In addition, in the aforementioned embodiments, each of the side frames 22, 22' having the same structures also could be adapted to fix one battery assembly B. In practice, each battery holder of the aforementioned embodiments also could be formed without the bottom frames 10, 64 and the side bars 40, 40'.

It must be pointed out that the embodiments described above are only some embodiments of the present invention. All equivalent structures which employ the concepts disclosed in this specification and the appended claims should fall within the scope of the present invention.

What is claimed is:

1. A battery holder, adapted to fix two juxtaposed battery assemblies, wherein each of the battery assemblies includes a plurality of battery modules arranged along a predetermined axial direction, the battery holder comprising:

at least two connecting shafts, each of which extending along the predetermined axial direction, wherein the at least two connecting shafts respectively pass through the battery modules of each of the battery assemblies;

a first lateral frame, including two side frames, wherein each of the side frames includes a main plate, a first side bar, and a second side bar; each of the main plates has a first blocking surface, and the first side bar and the second side bar are respectively connected to two opposite sides of the main plate; the first side bar has at least one first perforation, and the second side bar has at least one second perforation corresponding to the at least one first perforation; the at least one first perforation of the first side bar has a first width in the predetermined axial direction, and the at least one second perforation of the second side bar has a second width in the predetermined axial direction, wherein the first width is greater than the second width; the first side bar of one of the side frames is adjacent to the second side bar of the other of the side frames; an engaging member passes through the at least one first perforation of the first side bar and the at least one second perforation of the second side bar which are adjacent to each other to fix the first side bar to the second side bar; each of the at least two connecting shafts has one end connected to a corresponding one of the main plates of the side frames; and a second lateral frame, having two second blocking surfaces, wherein the second blocking surfaces respectively face toward the first blocking surface of the main plate of one of the side frames; each of the at least two connecting shafts has another end connected to the second lateral frame; the battery assemblies are respectively disposed between each of the first blocking surfaces and a corresponding one of the second blocking surfaces;

wherein the side frames of the first lateral frame are movable in the predetermined axial direction along the first width of the at least one first perforation, thereby adjusting a distance between the first lateral frame and the second lateral frame;

wherein both of the first side bar and the second side bar extend alone another axial direction, and the another axial direction is perpendicular to the predetermined axial direction; in the another axial direction, a height of the at least one first perforation is the same as a height of the at least one second perforation;

wherein each of the at least two connecting shafts has two opposing ends which are fastenable to the first lateral frame and the second lateral frame such that the battery assemblies are connected in a fixed position without a frame between the adjacent battery modules when assembled.

2. The battery holder of claim 1, wherein the at least one second perforation of each of the second side bars is a circular hole, and the at least one first perforation of each of the first side bars is long in shape, wherein a longitudinal direction of the at least one first perforation is parallel to the predetermined axial direction.

3. The battery holder of claim 1, further comprising a bottom frame; each of the side frames and the second lateral frame are respectively engaged with the bottom frame and are movable along the predetermined axial direction.

4. The battery holder of claim 3, wherein the bottom frame further has two first through holes; each of the side frames includes a bottom bar connected to a bottom of each of the main plates, wherein each of the bottom bars has a third perforation; a width of each of the third perforations in the predetermined axial direction is greater than a width of each of the first through holes in the predetermined axial direction; an engaging member passes through one of the third perforations and a corresponding one of the first through holes to fix the bottom bars to the bottom frame.

5. The battery holder of claim 1, further comprising two corner bars, wherein one end of each of the corner bars has a second through hole; the first side bar of each of the side frames has a fourth perforation, and the second side bar of each of the side frames has a fifth perforation; a width of each of the second through holes in the predetermined axial direction is greater than a width of each of the fourth perforations and a width of each of the fifth perforations in the predetermined axial direction; an engaging member passes through one of the fourth perforations and one of the second through holes which are corresponding to each other to fix one end of one of the corner bars to the first side bar which is not adjacent to the other side frame; an engaging member passes through one of the fifth perforations and one of the second through holes which are corresponding to each other to fix one end of another one of the corner-bars to the second side bar which is not adjacent to the other side frame; another end of each of the corner-bars is respectively engaged with two opposite sides of the second lateral frame.

6. The battery holder of claim 5, wherein each of the corner bars further includes a side plate and a top plate, wherein each of the side plates has the second through hole, and each of the top plates is connected to a top side of each of the side plates and is perpendicular to each of the side plates; each of the top plates has a plurality of holes spaced from one another by a distance in the predetermined axial direction, wherein the holes are long in shape, and a longitudinal direction of each of the holes is parallel to the predetermined axial direction.

7. A battery holder, adapted to fix a battery assembly, wherein the battery assembly includes a plurality of battery modules arranged along a predetermined axial direction, the battery holder comprising:
    at least one connecting shaft, extending along the predetermined axial direction and passing through the battery modules; and
    two lateral frames, spaced from each other by a distance in the predetermined axial direction; each of the lateral frames includes a main plate, a first side bar, and a second side bar, wherein the first side bar and the second side bar are respectively connected to two opposite sides of the main plate and the first side bar has at least one first perforation, and the second side bar has at least one second perforation corresponding to the at least one first perforation; the at least one first perforation of the first side bar has a first width in the predetermined axial direction, and the at least one second perforation of the second side bar has a second width in the predetermined axial direction, wherein the first width is greater than the second width; each of the main plates has a blocking surface, wherein the two blocking surfaces face each other; two opposite ends of the at least one connecting shaft are respectively connected to the two lateral frames; the battery assembly is disposed between the two blocking surfaces;
    a bottom frame, wherein the two lateral frames are respectively engaged with the bottom frame and are movable along the predetermined axial direction;
    wherein the bottom frame further has two first through holes; each of the lateral frames includes a bottom bar connected to a bottom of each of the main plates, wherein each of the bottom bars has a third perforation; a width of each of the third perforations in the predetermined axial direction is greater than a width of each of the first through holes in the predetermined axial direction; an engaging member passes through one of the third perforations and a corresponding one of the first through holes to fix the bottom bar to the bottom frame;
    wherein both of the first side bar and the second side bar extend alone another axial direction, and the another axial direction is perpendicular to the predetermined axial direction; in the another axial direction, a height of the at least one first perforation is the same as a height of the at least one second perforation;
    wherein each of the at least two connecting shafts has two opposing ends which are fastenable to the first lateral frame and the second lateral frame such that the battery assemblies are connected in a fixed position without a frame between the adjacent battery modules when assembled.

8. The battery holder of claim 7, wherein the at least one second perforation of each of the second side bars is a circular hole and the at least one first perforation of each of the first side bars is long in shape, wherein a longitudinal direction of the at least one first perforation is parallel to the predetermined axial direction.

9. The battery holder of claim 7, further comprising two corner bars, wherein each of two opposite ends of each of the corner bars has a second through hole; the first side bar of each of the lateral frames has a fourth perforation, and the second side bar of each of the lateral frames has a fifth perforation; a width of each of the second through holes in the predetermined axial direction is greater than a width of each of the fourth perforations and a width of each of the fifth perforations in the predetermined axial direction; an engaging member passes through one of the fourth perforations and one of the second through holes which are corresponding to each other to fix one end of the corner bar to the first side bar of the lateral frame; an engaging member passes through one of the fifth perforations and one of the second through holes which are corresponding to each other to fix another end of the corner bar to the second side bar of the lateral frame.

10. The battery holder of claim 9, wherein each of the corner bars further includes a side plate and a top plate, wherein each of two opposite ends of each of the side plates has the second through hole, and each of the top plates is connected to a top side of each of the side plates and is perpendicular to each of the side plates; each of the top plates has a plurality of holes spaced from one another by a distance in the predetermined axial direction, wherein the holes are long in shape, and a longitudinal direction of each of the holes is parallel to the predetermined axial direction.

* * * * *